Sept. 5, 1944. U. W. LEAVELL 2,357,593
METHOD AND APPARATUS FOR TEACHING READING
Filed Sept. 24, 1941 6 Sheets-Sheet 1

Inventor
ULLIN W. LEAVELL,
By
Attorney

Sept. 5, 1944.　　　U. W. LEAVELL　　　2,357,593
METHOD AND APPARATUS FOR TEACHING READING
Filed Sept. 24, 1941　　6 Sheets-Sheet 3

Inventor
ULLIN W. LEAVELL,
By
Attorney

Sept. 5, 1944.   U. W. LEAVELL   2,357,593
METHOD AND APPARATUS FOR TEACHING READING
Filed Sept. 24, 1941   6 Sheets-Sheet 5

Inventor
ULLIN W. LEAVELL,

Attorney

Sept. 5, 1944.                U. W. LEAVELL                2,357,593
              METHOD AND APPARATUS FOR TEACHING READING
                   Filed Sept. 24, 1941        6 Sheets-Sheet 6

Inventor
ULLIN W. LEAVELL,
By A. Yates Dowell
Attorney

Patented Sept. 5, 1944

2,357,593

UNITED STATES PATENT OFFICE 2,357,593

METHOD AND APPARATUS FOR TEACHING READING

Ullin W. Leavell, Nashville, Tenn.

Application September 24, 1941, Serial No. 412,185

21 Claims. (Cl. 35—35)

This invention relates to an apparatus for teaching educational subjects and particularly reading, and an object of the same is to facilitate correct visual activity and stimulate the mental faculties in the study of such subjects.

In the act of reading the human eye functions by a series of stops or fixations at which time perception is attained of the words, phrases or symbols which the student is endeavoring to read. Approximately ninety-five per cent of the time consumed in reading is taken up with these pauses or fixations and only about five per cent in the movement of the eye. Ideal reading habits involve more or less rhythmic fixations and movements of the eyes from left to right, with fixations on as much symbolic material at a given time as possible. Reading is a synthetic process and the larger the unit perceived at a given time, the more thought relation there is relayed to the brain for interpretation. Therefore, the more rapidly the individual can be taught to use the eyes in these fixations or pauses and rapid jumps from one unit of reading material or other suitable fixation indicia to another, the more nearly comprehension is derived, until the law of diminishing return sets in when the individual is no longer reading for comprehension but is scanning or skimming.

An important object of the present invention is to provide a new and improved apparatus for developing the correct method of reading.

One method of using the apparatus consists in dimly projecting onto a screen or the like a certain amount of prepared reading matter, for example, three lines, which may be termed the "field of vision or perception" and which forms a background, while at the same time a fractional portion of the middle line of the field of perception is momentarily accentuated by superior illumination sequentially and progressively from left to right until the complete line is read, whereupon the line read is advanced into the background or field and a new or succeeding line is advanced into the field, this process being repeated step by step until the reading lesson is completed. In this manner, the focal point of vision is concentrated upon a restricted area or field by the contrasting degree of illumination, while at the same time the larger field of pertinent subject matter may be perceived by the student. Thus a more or less rhythmic movement and speed of the eye is stimulated within a normal field of reading matter and units of thought relation are presented to the brain for interpretation and assimilation.

The method also contemplates the preparation and presentation of material relating to a given subject with varied vocabulary loads to accommodate the subject to pupils of different reading skills and mental abilities within one grade or group. For example, let it be assumed that a lesson in story form is to be prepared and presented to children of a certain grade and which grade has groups of three reading ability levels. The story will be prepared in three editions, all editions embodying the same plot and basic information but with the vocabulary of each edition corresponding to the reading ability of a respective grade level. Thus, the first edition will embody reading material having a vocabulary of a simplified nature adapted for pupils who are unable to read normal material for that grade; the next edition will embody a more advanced vocabulary up to grade level, while the third edition will embody a still heavier vocabulary load. In this manner, the school program may be adapted to meet the needs of all pupils in a given grade while at the same time conveying to their minds the same information and understanding and accelerating the reading abilities of the less capable readers until they attain or approximate the ability of the more advanced readers.

The method also comprehends, and the apparatus is adapted for, stimulation of the mental faculties by first projecting onto a screen or the like within the field of vision of the pupils certain subject matter in the form of pictorial illustrations, and immediately thereafter projecting a field or dim background of descriptive reading matter relating to the illustration, and intermittently brightly illuminating successive portions of the lines of said field in progressive sequence as heretofore noted.

An important result flowing from the use of the apparatus is the ease and economy of preparation of the material to be exhibited and the practically unlimited range of subjects which may be improvised according to the individual and group requirements, permitting a teacher or instructor to exercise ingenuity and intelligence to the $n$th degree.

The machine for carrying out the method permits the projection onto a screen or other suitable surface of a certain amount of reading material comprising the field of perception and which field is exhibited relatively dimly at all times though capable of being read, while within this field, portions of each line, for example three words of the middle line, are more brightly illuminated in sequential order from left to right across the field, to stimulate the focal point by the contrasting degree of illumination.

The machine embodies other important features and advantages which render it a definite improvement in educational devices of this general type, and which will become apparent in view of the following description taken in conjunction with the drawings, wherein:

Figure 1:
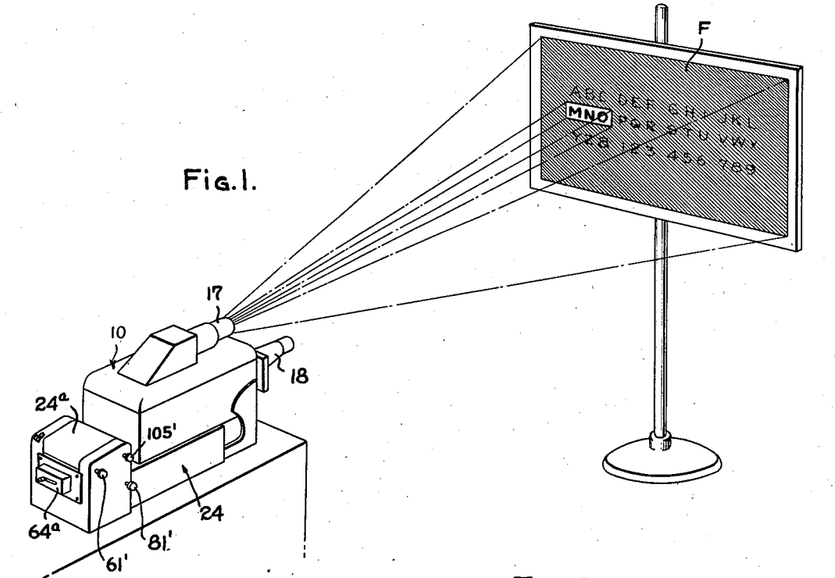
Fig. 1 is a view in perspective of a machine embodying the features of the invention shown projecting a field of reading matter onto a screen.
Figure 2:
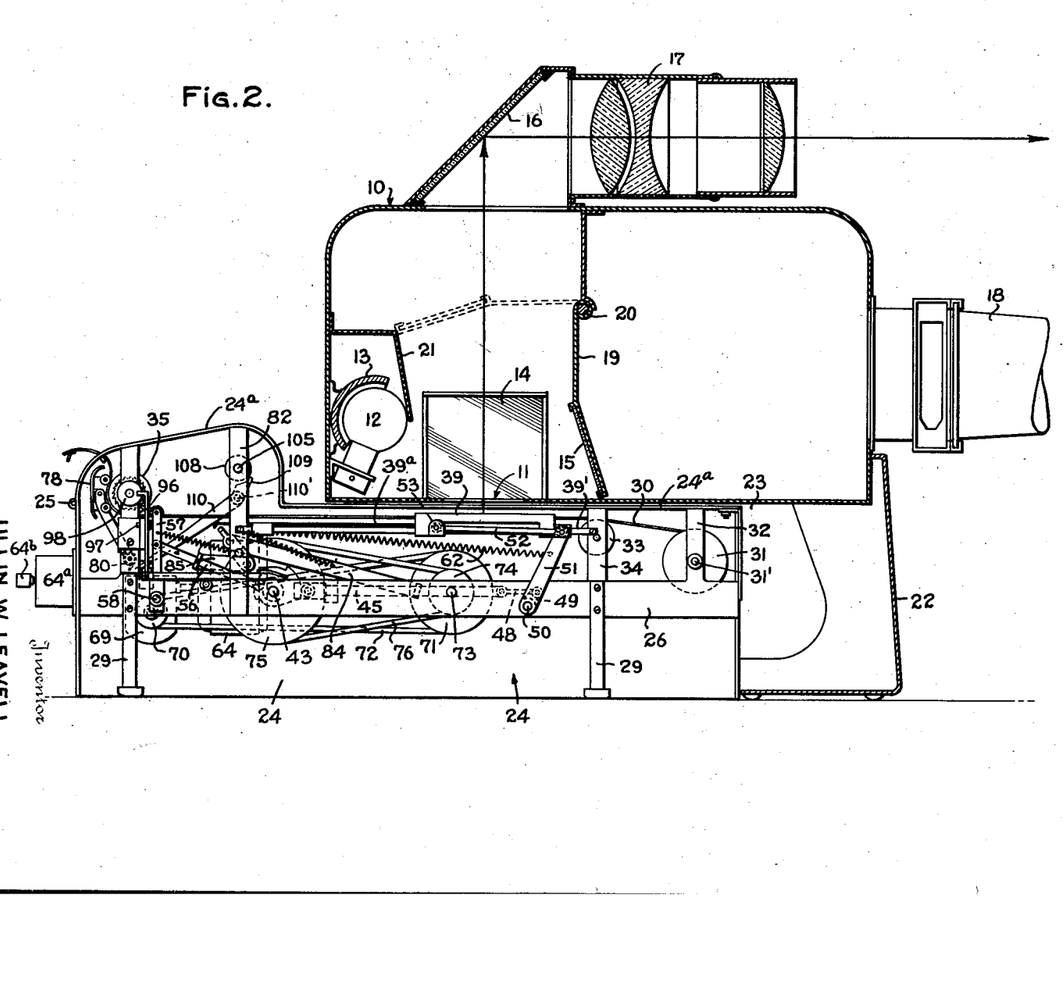
Fig. 2 illustrates the projector of Fig. 1 in longitudinal section with the side plates of the exposing unit removed.

Referring to the drawings in detail, a projector is generally indicated at 10, note Figs. 1 and 2, and comprises a housing or shell having an exposure aperture 11 in the bottom wall thereof through which the field of reading or other matter is exposed by the exposing unit in a manner to be described. A lamp 12 is mounted adjacent the aperture 11 and is provided with a reflector 13. The lamp 12 and reflector 13 are arranged to concentrate light rays on the aperture 11, and to provide for maximum concentration, additional reflectors in the form of mirrors 14 and 15 are disposed on opposite sides of and in front of the aperture 11 and tilted at an angle to reflect light rays downwardly thereinto.

The material exposed through the aperture 11 is projected upwardly onto an additional reflector in the form of a mirror 16 and thence into rectifying and projection lens 17, which in turn projects it onto the screen of Fig. 1. Ordinarily the reflecting system and lens 17 would be all that would be necessary for carrying out the functions of the exposing unit with which the present invention is primarily concerned. However, in certain instances, it may be desired to use the projector to illustrate matter carried by slides, as where a pictorial illustration of the subject matter of a lesson is to be displayed followed by a description of the illustration, in which event the reflector 15 is swung upwardly as shown in dotted lines in Fig. 2, whereupon rays from the lamp 12 are directed outwardly into and through lens 18, the reflector 15 being carried by shield 19 hinged at 20 for this purpose. A further shield 21 may be provided for preventing rays from the lamp 12 crossing those projected upwardly onto the reflector 16.

The base of the projector is provided with a stand 22 which together with the bottom wall of said base forms a recess 23 adapted to receive the exposing unit generally indicated at 24 in Fig. 1 and which will now be described.

The exposing unit is adapted to expose through the aperture 11 a field of vision or perception which in the present instance comprises three lines of reading matter forming part of the subject to be read, note Fig. 1 where the field is designated at F. This field is exposed through a translucent window, which may consist of a square piece of isinglass, Celluloid, glass, methyl methacrylate or other transparent materials colored light green, blue or other color, and within this field a certain portion of each line is more brightly illuminated, for example three words, in intermittent sequential relation from left to right until the complete line has been exposed.

The detail mechanism of the machine for carrying out this object is of course subject to variation. In the example illustrated, the machine comprises a housing having side walls 24', 24'' and a top wall or cover 24a hinged at 25. Within the housing is mounted a frame structure or chassis including longitudinal side members 26 and 26' and an intermediate member 27 held in definite spaced relation by spacers 28 and 28'. Legs 29 are connected to the longitudinal frame members at opposite extremities thereof and serve to support the unit as a whole.

The reading matter or other symbols or characters to be projected onto the screen may be typed on a sheet of paper or web 30. The web or sheet is initially wound on a roll 31 fixed on shaft 31, journaled in a bracket 32 and provided with a handle 31a, and is intermittently advanced beneath the top cover plate 24a of the exposing unit over guide roll 33, journaled in brackets 34 by feed roll 35, which feeds it outwardly over guide 36 through slot 37. As the sheets are used, they may be disposed flatwise in a box or other suitable container.

(Alternately, the sheets or webs 30 may be fed onto rolls in a manner to be described.)

Figure 3:
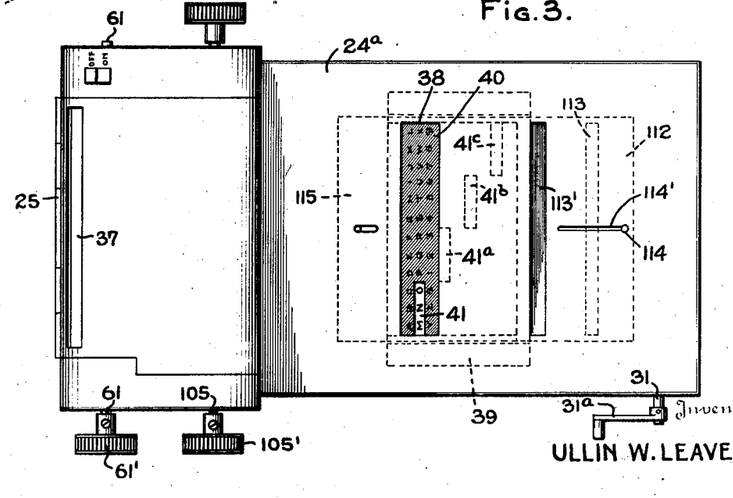
Fig. 3 is a plan view of the exposing unit.

The top cover 24a is provided with an exposure aperture 38, note particularly Fig. 3, adapted to expose a certain portion or number of lines of reading matter typed on the web 30, and beneath this aperture a reciprocating shutter-carriage or shuttle 39 is mounted to slide on guide bars 39' and carries a translucent shutter 40 having a series of slots 41, 41a, 41b and 41c formed therein. These slots are in effect attention directing means for progressively directing the eyes of the individual lengthwise of the lines of reading matter or fixation indicia. Between the guide bars 39' is a base plate 39a over which the sheet 30 slides and which operates to steady the sheet.

Reciprocation is imparted to the carriage 39 by means of cam 42 mounted on cam shaft 43 and formed with a plurality of stepped cam surfaces adapted to contact roller 44 mounted on the one end of spring-pulled connecting rod 45 having movement through guides 46 and 47. The opposite end of rod 45 has pivotally connected thereto a link 48 which in turn is connected to crank arm 49 secured on shaft 50; the latter extending across the machine and being journaled in the frame members 26. At its opposite ends the shaft 50 has connected thereto levers 51 which at their upper ends carry connecting rods 52 pivotally connected to bracket lugs 53 formed on the shuttle 39. As the carriage or shuttle 39 is returned to the right as viewed in Figs. 2 and 4, the sheet or web 30 is fed forwardly by feed roll 35 to bring the next consecutive line within the aperture 38 and to simultaneously position the next consecutive line which is to have sections thereof progressively brightly illuminated to a given station point in said aperture. This operation is brought about by means of cam 54 adapted to engage cam roller 55 mounted on the one end of connecting rod 56. The opposite end of rod 56 is connected to arm 57 pivoted at its lower end at 58 and its upper end carrying a pawl 59 adapted for one way engagement with the teeth of ratchet wheel 60 secured on shaft 61, provided with knob 61'. A clutch 61a provides a releasable driving connection between the ratchet wheel 60 and feed roll 35 similar to the conventional typewriter feed roll release, said clutch being disengageable by pulling outwardly on knob 61'.

Spring 62 normally holds the cam roller 44 against the cam 42 while spring 63 normally acts to hold cam roller 55 against cam 54.

Figure 4:
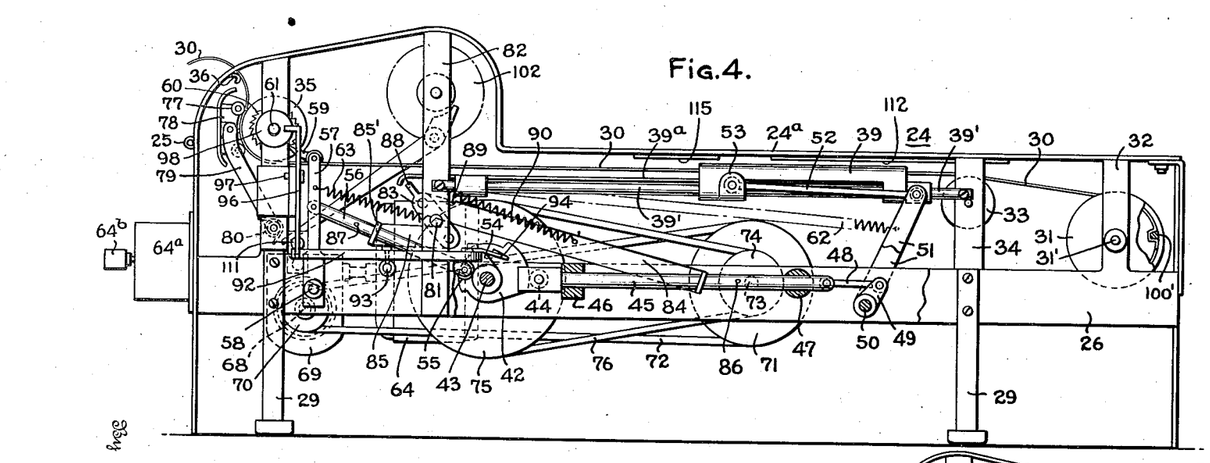
Fig. 4 is an enlarged view of the exposing unit of Fig. 2 with parts broken away and in section.

It will be seen that as the shaft 43 rotates in a clockwise direction as viewed in Figs. 2 and 4, cam 42 in conjunction with coacting linkage mechanism and spring 62 imparts a step-by-step movement to the shuttle or shutter-carriage 39 to the left as viewed in Figs. 2 and 4, and after the shuttle has reached its furthermost position to the left and begins to return to the right, cam 54 operates through rod 56 and lever 57 to rotate the feed roller 35 in a clockwise direction and advance the sheet or web 30 sufficiently to bring the next succeeding line of reading matter within the aperture 38.

Any suitable means may be used for driving the cam shaft 43. That herein shown comprises an electric motor 64, the speed of which may be regulated by resistance unit 64a provided with knob 64b. The motor 64 is provided with an armature shaft 65 having worm 66 thereon which drives worm gear 67 on shaft 68, said gears being mounted in gear housing 69. Also mounted on the shaft 68 is a pulley 70 which connects with pulley 71 by means of belt 72, the pulley 71 being mounted on shaft 73 which in turn is provided with speed reduction pulley 74 connecting with pulley 75 by means of belt 76, the pulley 75 being secured on cam shaft 43.

The web or sheet 30 is pressed into frictional engagement with the surface of the feed roll 35 by means of rollers 77 mounted on member 78 carried by arms 79 pivotally supported at their lower end and held under tension by means of spring 80.

At times it may become necessary to adjust characters or reading matter with respect to the aperture 38 and/or slots 41, as for example when the machine is loaded. After such adjustment or loading, it is desirable that the shutter 40 have the slots 41—41c in the correct position to start a new line. In other words, the shutter 40 and the carriage 39 as well as the feed roll 35 should be in proper timed position or relation with respect to the actuating means therefor, namely, the cams 42 and 54.

Accordingly, means are provided for disconnecting the actuating rods 45 and 56 from their coacting cams 42 and 54 preparatory to adjusting the reading matter with respect to the shutter or in loading the machine and for automatically timing or setting the machine after loading or adjustment and in preparation for starting the machine. Such means as herein shown comprises a shaft 81 journaled at opposite ends in brackets 82 and 82', and provided with knob 81'. An arm or toggle member 83 is secured on this shaft and at its upper end has pivotally connected thereto the one end of lever 84 which at its opposite end terminates in angular portion mounted to slide on the rod 45; while the lower or opposite end of the arm 83 has pivoted thereto lever 85 which at its outer end terminates in an angular portion 85' mounted to slide on connecting rod 56. A contact pin or stud 86 is secured on the rod 45 and another similar contact pin or stud 87 is secured on the rod 56. The toggle arm 83 is provided with a locking projection or lug 88 adapted to engage in a notch 89 when the said arm is rotated to its extreme throw-out position. A spring 90 acts to hold the parts in inoperative or non-throw-out position.

When the shaft 81 with the toggle arm 83 thereon is rotated clockwise as viewed in Figs. 2 and 4, levers 84 and 85 are moved in opposite directions into engagement with the pins 86 and 87, thereby holding the cam rollers 44 and 55 clear of their coacting cams 42 and 54, permitting the cam shaft 43 with the cams thereon to idle without imparting movement to the shuttle 39 or the feed roll 35.

To throw the parts into correct driving position automatically after the motor has been stopped and the machine loaded or the sheet 30 adjusted, a lever 92 is provided and is fulcrumed at 93 for universal movement, the right hand end of said lever being provided with contact member 94 which is adapted to be engaged by cam 54 and thrown upwardly against arm 84 to thereby release the lug 88 from notch 89, whereupon spring 90 returns the arms 56 and 45 to operative position with the cam rollers 55 and 44 in contact with the respective cams at the proper starting position, as shown in Fig. 4. A spring 95 acts on lever 92 to normally urge the contact member 94 against cam 54 when said member is in position overlying said cam.

Figure 7:
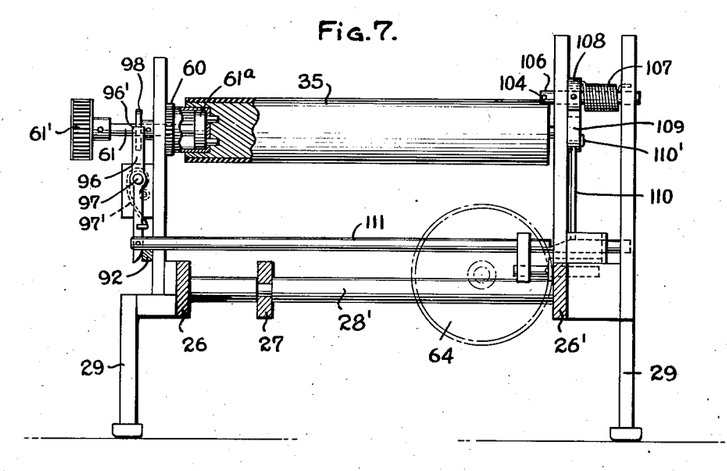
Fig. 7 is a section taken substantially on the line 7—7, Fig. 6.

The contact member 94 is normally held at one side of cam 54 free of contact therewith and has an operative connection with the feed roll clutch 61a so that when said clutch is engaged with the feed roll, the said contact member is moved over cam 54 into operative position ready to release locking lug 88 from its notch 89 upon rotation of shaft 43. Such operative connection is provided by lever 96 fulcrumed at 97, the lower portion of said lever being normally urged inwardly by spring 97', note Fig. 7. The upper end of lever 96 is provided with a clutch fork 96' in constant engagement with clutch collar 98 secured on and movable with shaft 61, while the lower end of said lever is cam-shaped so that it slides over the adjacent end of lever 92 when the knob 61' and collar 98 are pulled outwardly and get in behind the said end of lever 92. Thus when the knob 61' and collar 98 are pushed in to clutch the feed roll 35, the lower end of lever 96 is moved outwardly, swinging the contact member 94 inwardly over cam 54.

The machine operates as follows:

Let it be assumed that the machine is to be used to instruct a class of pupils in elementary reading. The reading matter may be prepared on the conventional typewriter, since the feed roll 35 is of the same diameter as that of the standard typewriter and the correct spacing between lines is thus assured. As far as word spacing is concerned, this may be done by the use of a pattern sheet or backing lined in accordance with the slots 41—41c. The instructor may accordingly type the entire lesson on a sheet or web 30.

Figure 8:
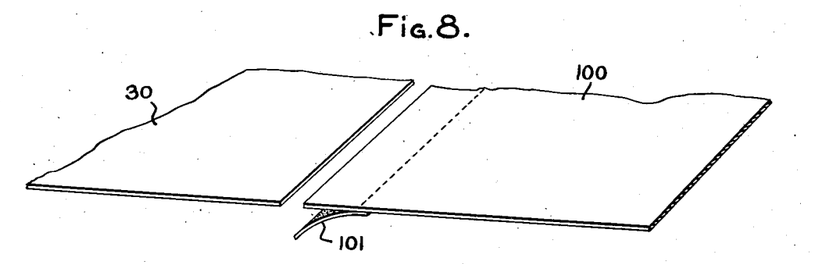
Figs. 8 and 9 are detail perspective views illustrating how the sheet or web bearing the matter to be exposed is connected to the leader of the loading roll.
Figure 9:
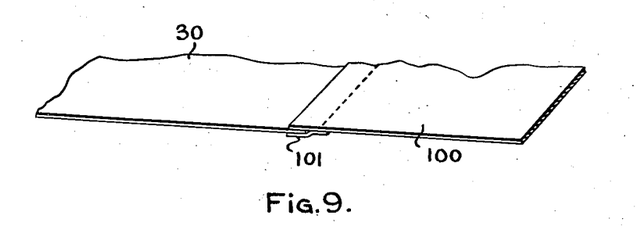

To facilitate loading, a leader 100 is detachably connected to roll 31 at 100', note Fig. 4, said leader having a sheet-engaging means at its free end, such as a piece of so-called "Scotch tape," indicated at 101, stitched or otherwise secured at one edge to the leader and having its opposite edge projecting free sufficiently to facilitate separation of the tape from the edge of the leader for insertion of the adjacent free edge of the sheet, note particularly Figs. 8 and 9.

Figure 5:
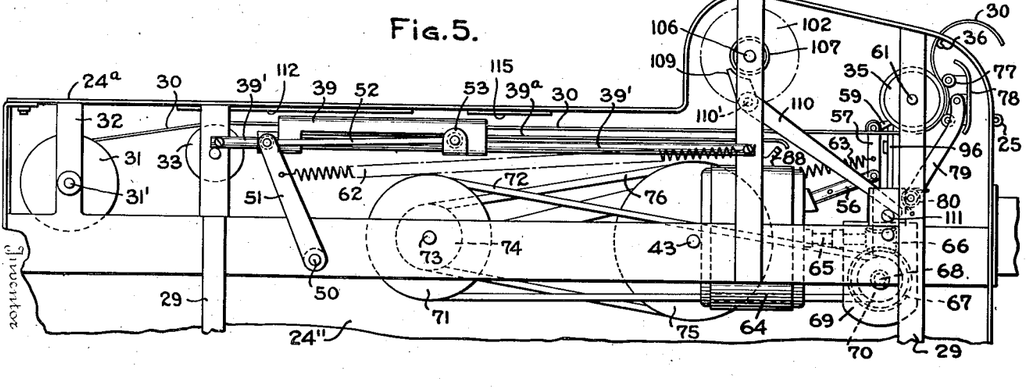
Fig. 5 is a view similar to Fig. 4 but showing the opposite side of said unit.
Figure 6:
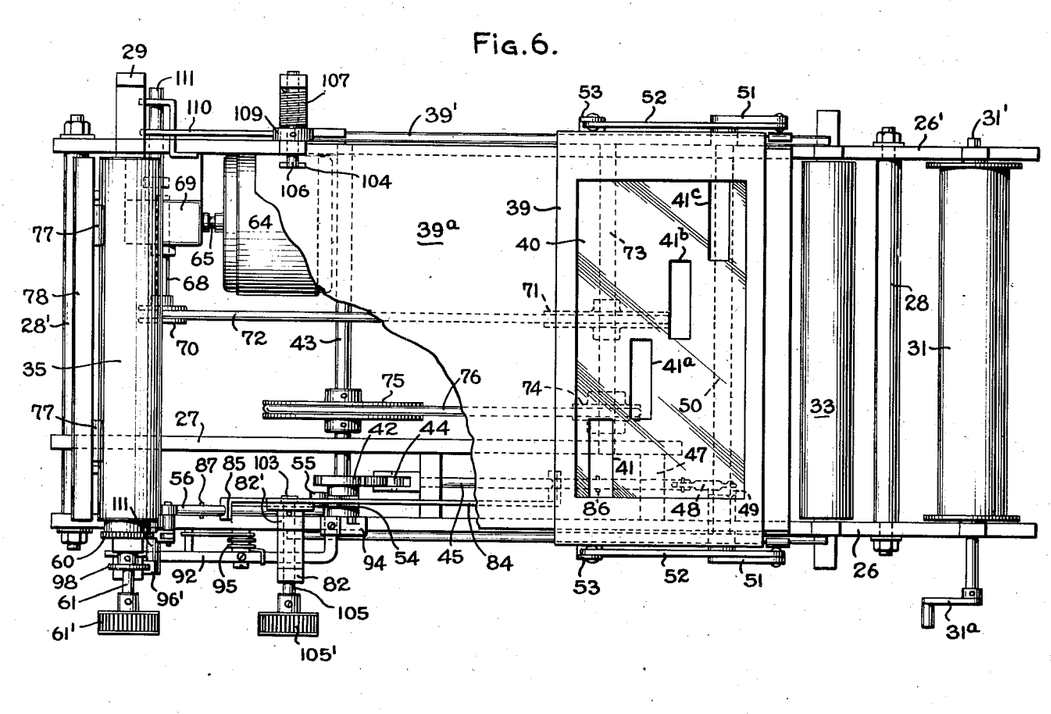
Fig. 6 is a plan view of the exposing unit enlarged with respect to Fig. 3 and having the top cover and side plates removed.

After the instruction sheet has been attached to the leader as just indicated, the roll 31 is turned clockwise as viewed in Figs. 4, 5 and 6, and the sheet wound thereon, it being understood, of course, that a certain portion of the sheet at the starting end to be initially gripped and feed outwardly through slot 37 by feed roll 35 will be left blank.

During the loading operation, the feed roll may be declutched by pulling outwardly on the knob 61'. Also, the knob 81' may be turned to disconnect the shuttle or carriage 39 and feed roll 35 from their actuating cams, so that when the reading matter has been centered within the aperture 38 and the feed roll 35 clutched by pushing in the knob 61', the machine will be correcttly timed or set for starting as heretofore explained. The exposure unit may then be inserted beneath the projector in the recess 23 with the aperture 38 in alignment with the aperture 11, so that the field of reading matter and background therefor is projected onto the screen through the lens 17 as illustrated in Fig. 1.

The matter projected onto the screen will bring within the field of vision of the student or students a certain number of lines of reading matter, which may be termed the field of vision or perception. These lines, while not brightly illuminated, are visible or readable, and at the same time a fractional portion of the middle line is more brightly illuminated sequentially and progressively from left to right as the slots 41—41c are intermittently advanced to register with the middle or intermediate line, until the complete line has been read. The shuttle or carriage 39 is then retracted to move the shutter 40 back to starting position and the feed roll 35 is rotated sufficiently to bring a succeeding line within the field of vision, whereupon the process is repeated.

While the shutter or movable masking member 40 for exposing the reading matter to the projector through the window or aperture 38 and aperture 11 is shown in the present instance as comprising a square of thin cellulosic material having windows or slots therein, it will be understood that any member could be substituted therefore which would function in substantially the same manner. For example, instead of displaying the reading matter by means of a reflecting system, it could be projected directly onto a screen by transmission rather than by reflection, in which event the reading matter would be typed on a transparent base and a suitable filter could be used as a shutter adapted to filter out certain types of rays and having areas therein of unlike filtering characteristics which would project certain areas in the field in marked contrast to other areas.

While the sheet or web feeding mechanism is preferably arranged to feed the sheet or web outwardly through the slot 37 so that it may be disposed flatwise in a box or other suitable receptacle, not shown, it may be desirable under certain conditions to wind the sheets or webs onto rolls, one of which is indicated in dot and dash lines at 102, said roll being gripped at opposite ends by means of clutch members 103 and 104. The member 103 is carried on the inner end of a slidable shaft 105 provided with a knob 105'; while the head 104 is carried by shaft 106. A spring 107 is wound on the shaft 106 and at its inner end is secured to a brake drum 108 secured on said shaft and at its outer end is engaged in an adjacent frame member. This spring 107 serves to tension the winding-on roll 102 when the latter is turned in one direction, or counter-clockwise as viewed in Figs. 2, 4 and 5. The sheet or web 30 is initially wound on the roll 102 and its free end then connected to the leader 100 and wound onto the back roll 31. The act of winding the sheet on roll 31 rotates the winding-on roll 102 against the tension of spring 107, so that when the machine is put in operation and the sheet or web is fed forwardly by roll 35, it will be automatically taken up by the roll 102.

To prevent free running of the roll 102 when the feed roll 35 is declutched, brake mechansim is provided for the said roll 102. Such mechanism in the example shown comprises a brake shoe 109 carried on the upper end of a lever 110 pivoted at 110'. At its lower end the lever 110 is adapted to be engaged by the cammed extremity of a rod 111 slidably mounted transversely of the machine, note particularly Fig. 7, and at its opposite end pivotally forked over the lower end of lever 96. When the clutch knob 61' is pulled out of declutch the roll 35, the rod 111 is pushed inwardly, thereby swinging the lever 110 downwardly and throwing the brake shoe 109 against the brake drum 108.

In certain instances it may be desired to project an entire line of reading matter onto the screen with adjacent lines completely blanked out as for example in phrase drills, arithmetic, etc. To provide for this contingency, a panel 112, note particularly Fig. 3, is mounted for sliding movement beneath the top cover 24a and is formed with an exposure window or slot 113, the panel being provided with a knob 114 movable in a slot 114' and whereby the panel may be slid forwardly over the active portion of the shutter 40 and at the same time closing exposure aperture 38. When this happens, the slot 113 will register with coacting exposure aperture or slot 113' formed in the cover 24a.

The panel 112 may also function alone or in conjunction with coacting panel 115 on opposite side of exposure window or aperture 38 to adjust the width of the latter.

Figure 10:
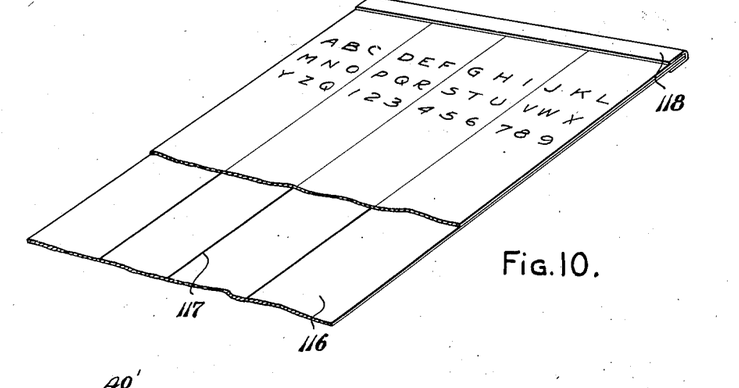
Fig. 10 is a fragmentary plan view of an indexing or alining form or chart that may be used in preparing reading matter.

As heretofore noted, the machine is so constructed that the material may be prepared on a standard typewriter. However, since the slots 41 in the shutter 40 are spaced predetermined distances apart transversely of the machine, it is of advantage to use a charted backing for the typed sheet to insure accurate registration of the respective words of each line with the slots. Fig. 10 illustrates a backing which may be used for this purpose, said backing sheet being indicated at 116 and having a series of heavy lines 117 thereon spaced in accordance with the slots 41—41c in the shutter 40. The sheet on which the material is to be typed should be sufficiently transparent to permit the lines 117 to show therethrough. To insure accurate alignment of the typed sheet with its backing, the ends of the sheet and backing to be inserted in the typewriter may be connected by a suitable flexible tab 118.

Thus, the reading material may be easily prepared by any teacher having use of a typewriter and in the light of activities in which the pupils are engaged at a given time. This also encourages the preparation of material which is most conducive to individual or group requirements, as for example, editions having varied or different vocabulary loads as heretofore indicated.

Figures 11, 12:
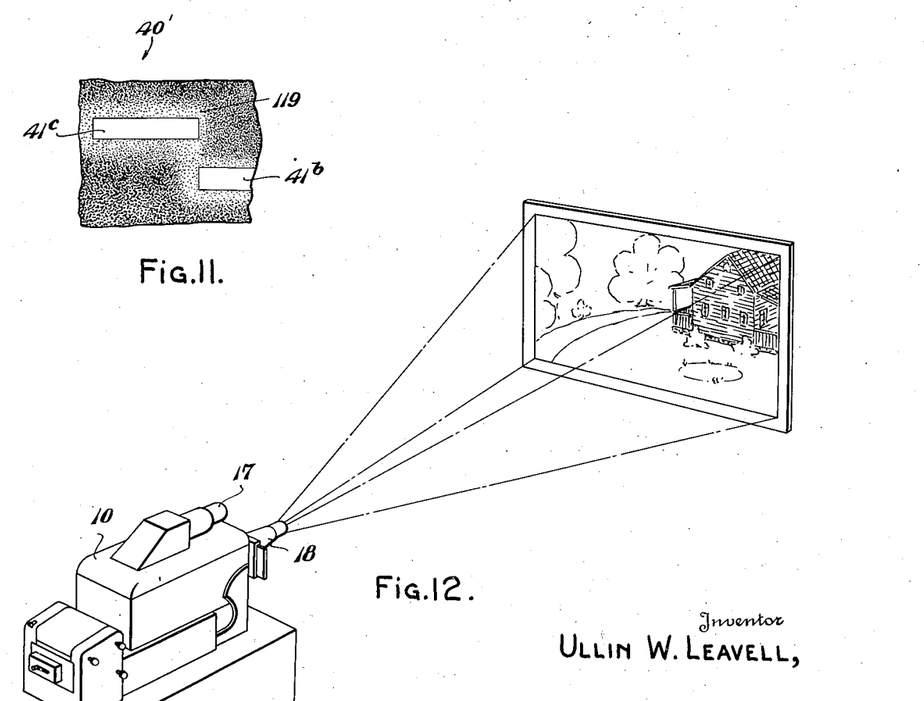
Fig. 11 is a plan view of a modified or alternate type of projection shutter.
Fig. 12 is a view similar to Fig. 1 showing how the machine may be operated to first project a pictorial or graphical illustration onto a screen and then follow this with a reading lesson in the form of a description or history of the illustration.

Under certain conditions it may be desirable to use shutters with varying intensity of color tint or translucency extending from the apertures 41 and merging into the "field." For example, the apertures themselves may be completely open or transparent, while starting at the edge of the aperture, the shutter may be given varying intensity of transparency to a depth equivalent to the deepest tint or dimness of the background or field, as indicated at 119 in Fig. 11, the shutter in this instance being indicated at 40'. This will eliminate the necessity of unnatural word combinations and isolation of phrases and will also provide a visual exhibition of reading matter which may be better adapted for certain types of work as well as pupils.

In connection with the shutter 40, it may also be desirable to vary the length of the respective slots 41—41c of different shutters to thereby vary the speed and/or recognition span of the brightly illuminated portions of the subject matter. In this manner, the recognition span may be controlled simply by substituting shutters having apertures of a length commensurate with the progress being made by the pupils. In using shutters having slots of different lengths, the timing of the machine will be adjusted accordingly. It is known that a first-grade child of normal ability reads on the average only three-fourths of a word per fixation, this ratio changing for pupils of different stages of advancement; and the flexibility of the machine herein disclosed permits adjustment of the recognition span to the needs of the pupils undergoing instructions.

Fig. 12 illustrates how the machine may be operated to first project a pictorial or graphic illustration onto a screen through the lens 18 and immediately follow this with a reading lesson projected through the lens 17 describing the illustration with intermittently brightly illuminated portions on a "field" or dim background as heretofore noted and with or without varying the vocabulary load. It is desirable that an individual approaching a new reading vocabulary have clear experience and perception imagery on which to base the associations of printed symbols with mental images; and the combination of services rendered possible by the machine facilitates this method of instruction. Maps, pictures, graphs and the like are examples of the type of illustrations that may be projected from slides through the lens 18. This method will bring out a pupil's faculties or powers of concentration and mental imagery where all others may fail.

The machine has demonstrated its effectiveness in reading instruction in actual use. It is relatively small and compact and may be easily operated by a layman. No attempt has been made herein to enumerate all of the advantages inherent in the machine.

It will be understood that the apparatus as herein illustrated is subject to simplification and variation in construction and design, and that the detailed illustration and description of parts is not to be considered as a limitation since the scope of the invention is defined by the appended claims.

What is claimed is:

1. In apparatus for teaching reading, a surface on which the matter to be read may be projected, a projector, and an independent exposure unit coacting with the projector and provided with a shutter through which reading matter may be exposed, said shutter rendering the major portion of the reading matter less perceptible than selected portions thereof.

2. In apparatus for teaching reading, a surface on which the matter to be read may be projected, a projector, and independent means for exposing reading matter to the projector including a member functioning in the nature of a shutter for exposing a body of reading matter constituting a field and to expose, within this field progressively from left to right, portions in sequence more clearly than the remaining portion of the field.

3. In apparatus for teaching reading, a projector, a surface on which the matter to be read may be projected, and means for exposing a selected field of reading matter to the projector including a shutter, means for reciprocating the shutter, said shutter being in the main translucent and having areas arranged in stepped relation in the plane of reciprocation for exposing a line of reading matter within the field to the projector in marked contrast to the matter exposed through the translucent area of the shutter.

4. In apparatus for teaching reading, a projector, a surface on which the matter to be read may be projected, said projector having an aperture, an exposing unit for exposing reading matter to the projector through said aperture, said unit including a member functioning in the nature of a shutter comprising in the main translucent material exposing a plurality of lines of reading matter with sufficient clarity to render it readable within normal focal range and having areas therein for exposing individual successive lines of reading matter progressively and in sequence from left to right in the direction of reading with a greater degree of clarity than the remaining lines.

5. In a machine for teaching reading, a projector, a surface on which the matter to be read may be projected, said projector having an aperture therein through which the matter to be read may be exposed, an exposure unit having a shutter in registration with said opening, means for reciprocating the shutter, said shutter being provided with portions arranged in stepped relation in the plane of reciprocation of the shutter for exposing selected lines of reading matter with a greater degree of illumination than immediately preceding and succeeding lines, and means for intermittently advancing the reading matter to bring the latter within the exposure area.

6. In apparatus for teaching reading, a wall having an exposure window therein, a shutter, means movably mounting said shutter adjacent said window, means for advancing a sheet bearing reading matter between the shutter and window, means for intermittently advancing said shutter in the direction of movement of the sheet and for thereafter retracting said shutter, said shutter exposing through said window successive lines of reading matter in spaced progression and sequence in the direction of reading while partially masking the immediately preceding and succeeding lines.

7. In apparatus for teaching reading, a wall having an exposure window therein, means for supporting a sheet bearing printed matter or like indicia adjacent said window, a shutter interposed between said sheet and said window, means imparting to said shutter intermittent movement in the direction of travel of said sheet, said shutter comprising a piece of translucent material having contrasting areas therein arranged in spaced stepped relation in the direction of travel of the sheet and whereby a line of reading matter is exposed in spaced progression and sequence in the direction of reading in contrast to bordering reading matter, means for retracting said shutter after intermittent forward movement has ceased, and means for advancing said sheet.

8. In apparatus for teaching reading, a casing having a wall therein provided with an exposure window, a reciprocating carriage mounted adjacent said window, means for feeding a sheet bearing fixation indicia adjacent said carriage, means for intermittently advancing the carriage in the direction of movement of the sheet and for thereafter retracting the carriage, and a shutter mounted on said carriage between the sheet and window, said shutter having a series of exposure areas therein arranged in spaced stepped relation whereby successive lines of reading matter may be exposed progressively from left to right in the direction of reading.

9. In apparatus for teaching reading, a casing having an exposure window therein, a reciprocating carriage mounted adjacent said window within the casing, means supporting a web bearing fixation indicia adjacent said carriage, a shutter mounted on the carriage between the sheet and the window, said shutter being in the main formed of translucent material adapted to expose a certain portion of the reading matter through the window and which portion constitutes a field of perception, the shutter having a series of windows therein arranged in stepped relation at substantially right angles to the direction of reading and in connected sequence from left to right whereby successive lines within the field may be exposed with full visibility for reading with contiguous matter exposed on a background of reduced visibility, means for imparting a step-by-step movement to the carriage in the direction of movement of the sheet and for thereafter retracting the carriage, and means for intermittently advancing the sheet.

10. In apparatus for teaching reading, a casing having an exposure window therein, a carriage movably mounted adjacent said window within the casing, means for supporting a sheet bearing fixation indicia adjacent said carriage, means for advancing said carriage step-by-step in the direction of movement of the sheet and for thereafter retracting the carriage, a shutter mounted on said carriage and interposed between the sheet and window, said shutter having windows therein adapted to expose successive lines of fixation indicia progressively from left to right in the direction of reading, and means for intermittently advancing said sheet to present successive reading matter to exposure position.

11. In a machine for teaching reading, a casing having an exposure window therein, a carriage movably mounted within said casing adjacent said window, means for feeding a sheet bearing the matter to be read adjacent said carriage, a shutter mounted on said carriage between the sheet and said window, said shutter being adapted to expose successive lines of reading matter progressively from left to right in the direction of reading, cam means operating in timed relation to said feeding means for reciprocating said carriage intermittently in a forward direction and for thereafter retracting said carriage, and means for disconnecting said carriage and said feeding means from said cam means to facilitate adjustment of said sheet.

12. In a machine for teaching reading, a casing having an exposure window therein, a carriage movably mounted within said casing adjacent said window, means for feeding a sheet bearing reading matter adjacent said carriage, a shutter mounted on said carriage between the sheet and said window, said shutter being provided with windows adapted to expose successive lines of reading matter progressively in the direction of reading, cam means operating in timed relation to said feeding means for imparting movement to said carriage in the direction of feed of said sheet and for thereafter retracting said carriage, means for disconnecting and locking out said carriage and said feeding means with respect to their actuating cams to facilitate adjustment of said sheet, and means for automatically releasing said disconnecting means at a predetermined angular position of said actuating cams to thereby reset the machine in proper starting position.

13. In a machine for teaching reading, a casing having an exposure window therein, means for feeding a sheet bearing reading matter adjacent said window, a roll on which said sheet is initially wound and a feed roll adapted to feed the sheet from said first-named roll, said first-named roll being provided with a leader having means adapted to engage the contiguous edge of a sheet to facilitate winding of the sheet on said latter roll.

14. In apparatus for teaching reading, in combination with a projector, a wall having an exposure window therein, a shutter, said shutter exposing a body of reading matter constituting a relatively dim field of perception exposing within this field portions of each line of reading matter in progressive sequence more clearly than the remaining portion of the field, the more brightly exposing areas gradually merging with the dim field.

15. In apparatus for teaching reading, a projector, and means for exposing reading matter to the projector including a member functioning in the nature of a shutter, said member being formed of translucent material with substantially lucid areas therein and whereby a certain number of lines of reading matter may be relatively dimly exposed as a field of perception and within this field portions of individual lines more brightly exposed from left to right in sequence, said lucid areas gradually becoming translucent as they merge into the field.

16. In apparatus for exhibiting fixation indicia on a surface, a projector for projecting the indicia on said surface, and an independent exposure unit coacting with the projector and provided with means functioning in the nature of a shutter to expose the indicia, and said means rendering the major portion of the indicia exhibited less perceptible than a selected portion thereof.

17. In apparatus for exhibiting fixation indicia on a surface, the combination of a projector, independent means for exposing the indicia to the projector including a member functioning in the nature of a shutter for exposing a body of indicia constituting a field and to expose portions within this field progressively more clearly than the remaining portion of the field.

18. Apparatus for use with a light projector, reflecting means and a projecting system for exhibiting fixation indicia on a surface on which the indicia may be projected, comprising an exposure means embodying a window opening to be illuminated, means having fixation indicia for exposure through said window opening, means overlying said fixation indicia having attention-directing means for functioning cooperatively with the indicia, means for positioning lines of said fixation indicia to be visible through the window opening, and means for moving said attention-directing means longitudinal of a selected line of indicia whereby said line of indicia and said attention-directing means may be illuminated with the image thereof reflected by the reflector, and with said projecting system being adapted to direct said reflected image onto said surface.

19. A device of the character described for use with a viewing screen, a light projector and a projecting system embodying reflecting means, said device comprising a casing having a window opening therein, means for supporting a strip of sheet-like material having lines of indicia thereon for movement transversely of said window opening to be illuminated, reflected and projected by said projector onto said viewing screen, means for advancing said sheet-like material for positioning successive lines of indicia within the area of the window opening, and means for exposing portions only of said indicia in the direction of said lines when located in said window opening, said device being in the form of a separate unit which may be associated with said source of illumination and projecting system.

20. In a device of the character described for use with a viewing screen, the combination of means having a source of illumination and a projecting system embodying reflecting means for directing light from said source of illumination to said viewing screen, means embodying a casing having a window opening, means for supporting a strip of sheet-like material having lines of indicia thereon for movement transversely of said window opening to be reflected and projected onto said viewing screen, means for advancing said sheet-like material for positioning successive lines of indicia within the area of the window opening, and means for exposing portions only of said indicia in the direction of said lines when located in said window opening whereby said portions will be illuminated by said source of illumination and will be reflected and projected onto said viewing screen, said means embodying said casing having the window opening therein, said sheet-like material having indicia thereon and means for exposing portions only of said indicia being in the form of a separate device which may be associated with said source of illumination and projecting system.

21. Apparatus for exhibiting fixation indicia on a surface on which the indicia may be projected, comprising, in combination, a light projector embodying a source of illumination, reflecting means and a projecting system, an exposure means coacting with the projector and embodying a window opening to be illuminated by the source of illumination, means having fixation indicia for exposure through said window opening, means overlying said fixation indicia having attention-directing means for functioning cooperatively with the indicia, means for positioning lines of said fixation indicia to be visible through the window opening, and means for moving said attention-directing means longitudinally of a selected line of indicia whereby said line of indicia and said attention-directing means will be illuminated by said source of illumination with the image thereof reflected by the reflector, and with said projecting system being adapted to direct said reflected image onto said surface.

ULLIN W. LEAVELL.